(12) United States Patent
Ma et al.

(10) Patent No.: US 7,944,999 B2
(45) Date of Patent: May 17, 2011

(54) ROBUST FINE FREQUENCY AND TIME ESTIMATION IN MOBILE MULTIMEDIA MULTICAST SYSTEM RECEIVERS

(75) Inventors: Jun Ma, Irvine, CA (US); Nabil Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 594 days.

(21) Appl. No.: 12/062,774

(22) Filed: Apr. 4, 2008

(65) Prior Publication Data

US 2009/0252239 A1  Oct. 8, 2009

(51) Int. Cl.
*H04L 27/00* (2006.01)
(52) U.S. Cl. .................. 375/326; 375/344; 375/355
(58) Field of Classification Search .............. 375/316, 375/326, 355, 362, 371, 344; 370/203, 206, 370/500, 516
See application file for complete search history.

(56) References Cited

U.S. PATENT DOCUMENTS

| 7,627,049 B2 * | 12/2009 | Kim ................................ 375/260 |
| 7,693,039 B2 * | 4/2010 | Roh et al. ....................... 370/208 |
| 7,706,823 B2 * | 4/2010 | Buda et al. ..................... 455/502 |
| 7,733,971 B2 * | 6/2010 | Roh et al. ....................... 375/260 |
| 2006/0176802 A1 * | 8/2006 | Ko et al. ......................... 370/208 |
| 2009/0046816 A1 * | 2/2009 | Hong et al. .................... 375/340 |

* cited by examiner

*Primary Examiner* — Jean B Corrielus
(74) *Attorney, Agent, or Firm* — Rahman LLC

(57) ABSTRACT

A technique for estimating a carrier frequency offset and a timing offset in a MediaFLO™ (Forward Link Only) system, wherein the method comprises receiving Orthogonal Frequency Division Multiplexing (OFDM) symbols; interpolating pilots on odd or even symbols of the received OFDM symbols; determining a phase difference between two successive symbols using the interpolated pilots; obtaining an estimate of the carrier frequency offset and the timing offset from the determined phase difference between two successive symbols; and correcting a sampling frequency in accordance with the estimated carrier frequency offset and timing offset.

20 Claims, 11 Drawing Sheets

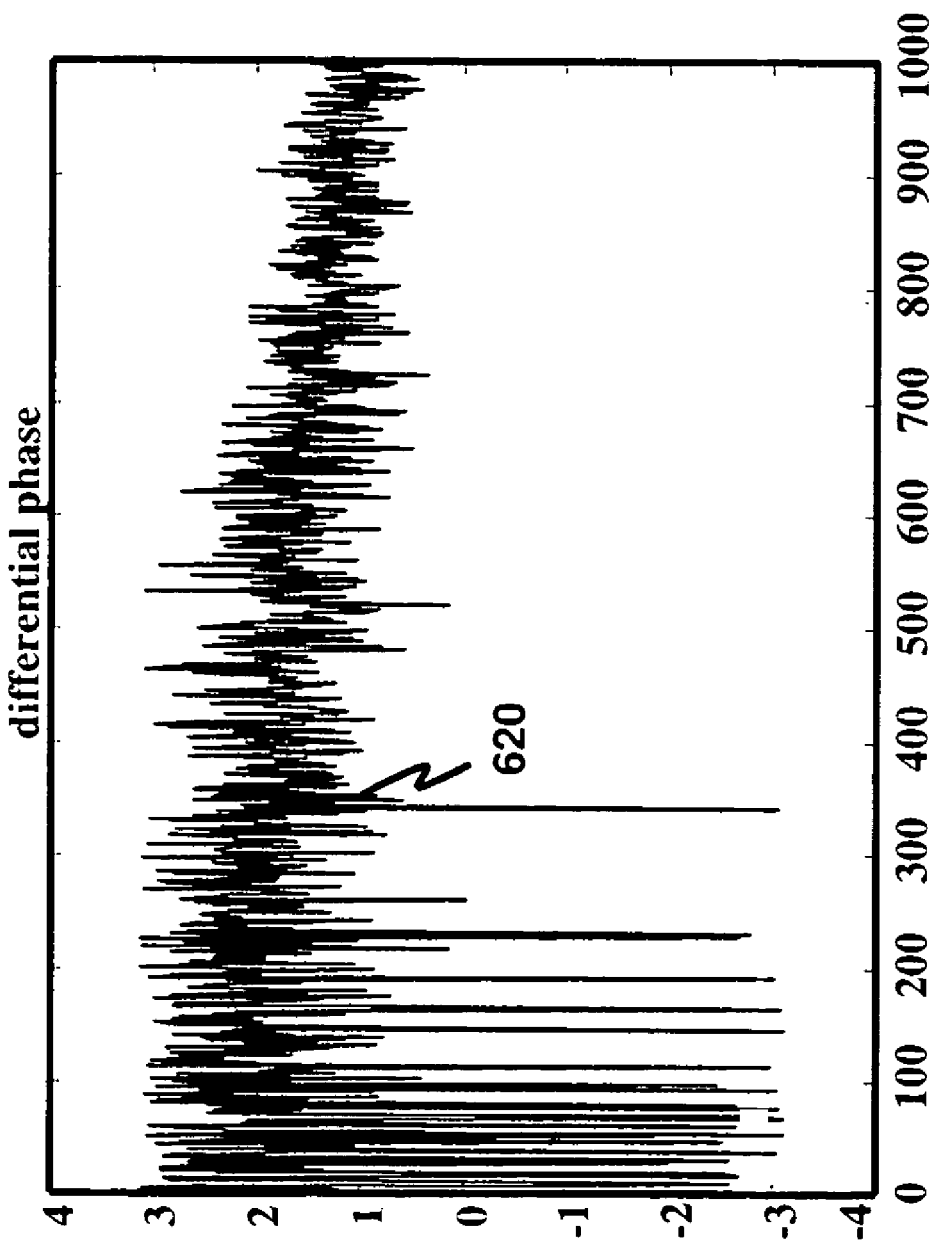

ROBUST FINE FREQUENCY AND TIME ESTIMATION IN MOBILE MULTIMEDIA MULTICAST SYSTEM RECEIVERS

BACKGROUND

1. Technical Field

The embodiments herein generally relate to wireless communications, and, more particularly, to a method and apparatus for carrier frequency offset and timing offset estimation in a MediaFLO™ (Forward Link Only) system.

2. Description of the Related Art

In recent years, the wireless industry has seen explosive growth in device capability, especially in relation to mobile devices, such as cell phones, handhelds, gaming consoles, etc. Ever-increasing demand for computing power, memory, and high-end graphic functionalities has accelerated the development of new and exciting wireless services. In the last few years, multiple technologies have been proposed to address delivery of streaming multimedia to mobile devices.

Multimedia communications provide a rich and immediate environment of image, graphics, sound, text and interaction through a range of technologies. An example of multimedia communication is streaming multimedia which is primarily a delivery of continuous synchronized media data. The streaming multimedia is constantly received by, and displayed to an end user while it is being delivered by a provider. Multiple technologies such as Integrated Services Digital Broadcasting-Terrestrial (ISDB-T), Terrestrial-Digital Multimedia Broadcasting (T-DMB), Satellite-Digital Multimedia Broadcasting (S-DMB), Digital Video Broadcasting-Handheld (DVB-H), and FLO (Forward Link Only) are used to address the delivery of streaming multimedia to mobile devices. These technologies have typically leveraged upon either third generation cellular/PCS, or digital terrestrial TV broadcast technologies.

For delivering unprecedented volumes of high-quality, streaming or clipped, audio and video multimedia to wireless subscribers, an air interface has been developed based on FLO technology for MediaFLO™ mobile multimedia multicast system available from Qualcomm, Inc., California, USA. MediaFLO™ or media forward link only is a combination of the media distribution system and the FLO technology. The FLO technology is the ability to deliver a rich variety of content choice to consumers while efficiently utilizing spectrum as well as effectively managing capital and operating expenses for service providers. The details of the MediaFLO™ mobile multimedia multicast system are available in Chari, M. et al., "FLO Physical Layer: An Overview," IEEE Transactions on Broadcasting, Vol. 53, No. 1, March 2007, the contents of which, in its entirety, is herein incorporated by reference.

FLO technology was designed specifically for the efficient and economical distribution of the same multimedia content to millions of wireless subscribers simultaneously. Also, the FLO technology was designed from the ground up to be a multicasting network, which is overlaid upon a cellular network. It does not need to support any backward compatibility constraints. Thus, both the network infrastructure and the receiver devices are separate from those for the cellular/PCS network. Moreover, as the name suggests, the technology relies on the use of a forward link (network to device) only.

FLO enables reducing the cost of delivering such content and enhancing the user experience, allowing consumers to "surf" channels of content on the same mobile handsets they use for traditional cellular voice and data services. MediaFLO™ technology can provide robust mobile performance and high capacity without compromising power consumption. The technology also reduces the network cost of delivering multimedia content by dramatically decreasing the number of transmitters needed to be deployed. In addition, MediaFLO™ technology-based multimedia multicasting complements wireless operators' cellular network data and voice services, delivering content to the same cellular handsets used on 3G networks.

The MediaFLO™ wireless system has been designed to broadcast real time audio and video signals, apart from non-real time services to mobile users. The system complements existing networks and radically expands the ability to deliver desired content without impacting the voice and data services. Operators can leverage the MediaFLO™ system to increase average revenue per user (ARPU) and reduce churn by offering enhanced multimedia services. Content providers can take advantage of a new distribution channel to extend their brand to mobile users. Device manufacturers will benefit from increased demand for multimedia-enabled handsets as consumer appetite grows for the rich content provided through MediaFLO™ systems.

The MediaFLO™ service is designed to provide the user with a viewing experience similar to a television viewing experience by providing a familiar type of program-guide user interface. Users can simply select a presentation package, or grouping of programs, just as they would select a channel to subscribe to on television. Once the programs are selected and subscribed to, the user can view the available programming content at any time. In addition to viewing high quality video and audio content and IP data, the user may also have access to related interactive services, including the option to purchase a music album, ring tone, or download of a song featured in a music program. The user can also purchase access to on-demand video programming, above and beyond the content featured on the program guide.

The respective MediaFLO™ system transmission is carried out using tall and high power transmitters to ensure wide coverage in a given geographical area. Further, it is common to deploy 3-4 transmitters in most markets to ensure that the MediaFLO™ system signal reaches a significant portion of the population in a given market. During the acquisition process of a MediaFLO™ system data packet several determinations and computations are made to determine such aspects as frequency offsets for the respective wireless receiver. Given the nature of MediaFLO™ system broadcasts that support multimedia data acquisitions, efficient processing of such data and associated overhead information is paramount.

For instance, in a typical communication receiver design, the sampling time of the receiver is usually not commensurate with that of the transmitter, and a carrier and time offset exists between the transmitter and the receiver. Therefore, the resulting carrier and time offset need to be estimated and then corrected to ensure reliable quality communication. Similarly, in Orthogonal Frequency Division Multiplexing (OFDM) based communication systems like MediaFLO™ for mobile TV broadcasting applications, the phase difference between successive OFDM symbols are first taken on corresponding pilots to obtain a fine estimate of the carrier and time offset, and the channel frequency response are then estimated and equalized. However, in MediaFLO™ receiver design, since the OFDM pilots exists every other OFDM symbols, the carrier offset estimation range are limited to +/−0.25 OFDM sub carrier spacing, which corresponds to about +/−340 Hz carrier frequency offset. In practice this range might not be sufficient. Accordingly, there remains a need for a novel Doppler frequency estimation technique that permits estimation of high Doppler frequencies to further increase the fine carrier frequency estimation range in Media-FLO™ receiver design to about +/−0.5 OFDM sub carrier spacing, which corresponds to about +/−680 Hz at almost no complexity increment.

SUMMARY

In view of the foregoing, an embodiment herein provides a method of estimating a carrier frequency offset and a timing offset in a MediaFLO™ (Forward Link Only) system, and a program storage device readable by computer, tangibly embodying a program of instructions executable by said computer to perform the method of estimating a carrier frequency offset and a timing offset in a MediaFLO™ (Forward Link Only) system, wherein the method comprises receiving OFDM symbols; interpolating pilots on odd or even symbols of the received OFDM symbols; determining a phase difference between two successive symbols using the interpolated pilots; obtaining an estimate of the carrier frequency offset and the timing offset from the determined phase difference between two successive symbols; and correcting a sampling frequency in accordance with the estimated carrier frequency offset and timing offset.

Preferably, determining the phase difference occurs using relation:

$$\Delta \varphi_k = 2\pi \left( \Delta f + \frac{\delta}{T_u} \cdot k \right),$$

wherein $\Delta \phi_k$ is a differential phase between two successive symbols of sub-carrier index k in rad/symbol, $\Delta f$ is the carrier offset between a receiver and a transmitter in said Media-FLO™ (Forward Link Only) receiver system in terms of sub-carrier bin duration, $$\delta = \frac{T - T'}{T'},$$

where T is a transmitter sampling period and T' is a receiver sampling period, k is the sub-carrier index, and $T_u$ is an OFDM symbol duration excluding a guard interval.

Moreover, the method may further comprise determining $\Delta \phi_k$ for multiple sub-carrier index k using said relation; and representing the resulting values of $\Delta \phi_k$ graphically. Additionally, obtaining of the estimate of the carrier frequency offset may be derived as the mean of intercept of the graphically represented values of $\Delta \phi_k$ and the timing offset may be derived as the slope of the graphically represented values of $\Delta \phi_k$.

Preferably, an estimate of the timing offset $\phi_\Delta$ and the carrier frequency offset $\phi_\mu$ is obtained using:

$$\varphi_\Delta = \frac{4}{L^2} \sum_{k=0}^{\frac{L}{2}-1} \left( \Delta \varphi_{\frac{L}{2}+k} - \Delta \varphi_k \right),$$

$$\varphi_\mu = \frac{1}{L} \sum_{k=0}^{L-1} \Delta \varphi_k$$

wherein L is a total number pilots involved in the estimation within one OFDM symbol.

Furthermore, a relationship between the phase difference $\Delta \phi_k$, the timing offset δ, and the carrier offset $\Delta f$ is given by:

$$\Delta \varphi_k = 4\pi \left( \Delta f + \frac{\delta}{T_u} \cdot k \right),$$

wherein when there is no timing offset, $\Delta f$ takes a maximum value when $\Delta \phi_k = \pm \pi$.

Another embodiment includes an apparatus for estimating a carrier frequency offset and a timing offset in a Media-FLO™ (Forward Link Only) system, wherein the apparatus comprises a receiver adapted to receive OFDM symbols; a processor adapted to interpolate pilots on odd or even symbols of the received OFDM symbols; a calculator adapted to determine a phase difference between two successive symbols using the interpolated pilots; an estimator adapted to obtain an estimate of the carrier frequency offset and the timing offset from the determined phase difference between two successive symbols; and means for correcting a sampling frequency in accordance with the estimated carrier frequency offset and timing offset.

The calculator may be further adapted to determine the phase difference using relation:

$$\Delta \varphi_k = 2\pi \left( \Delta f + \frac{\delta}{T_u} \cdot k \right),$$

wherein $\Delta \phi_k$ is a differential phase between two successive symbols of sub-carrier index k in rad/symbol, $\Delta f$ is the carrier offset between a receiver and a transmitter in said Media-FLO™ (Forward Link Only) receiver system in terms of sub-carrier bin duration, $$\delta = \frac{T - T'}{T'},$$

where T is a transmitter sampling period and T' is a receiver sampling period, k is the sub-carrier index, and $T_u$ is an OFDM symbol duration excluding a guard interval.

The calculator may be further adapted to determine $\Delta \phi_k$ for multiple sub-carrier index k using said relation; and represent the resulting values of $\Delta \phi_k$ graphically. Furthermore, the estimate of the carrier frequency offset may be derived as the mean of intercept of the graphically represented values of $\Delta \phi_k$ and the timing offset may be derived as the slope of the graphically represented values of $\Delta \phi_k$.

Preferably, an estimate of the timing offset $\phi_\Delta$ and the carrier frequency offset $\phi_\mu$ is obtained using:

$$\varphi_\Delta = \frac{4}{L^2} \sum_{k=0}^{\frac{L}{2}-1} \left( \Delta \varphi_{\frac{L}{2}+k} - \Delta \varphi_k \right),$$

$$\varphi_\mu = \frac{1}{L} \sum_{k=0}^{L-1} \Delta \varphi_k$$

wherein L is a total number pilots involved in the estimation within one OFDM symbol.

Furthermore, a relationship between the phase difference $\Delta \phi_k$, the timing offset δ, and the carrier offset $\Delta f$ is given by:

$$\Delta \varphi_k = 4\pi \left( \Delta f + \frac{\delta}{T_u} \cdot k \right),$$

wherein when there is no timing offset, $\Delta f$ takes a maximum value when $\Delta \phi_k = \pm \pi$.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 6B illustrates a simulation result of a straight line obtained using a technique based on interpolated pilots;

DETAILED DESCRIPTION OF PREFERRED EMBODIMENTS

Figure 1:
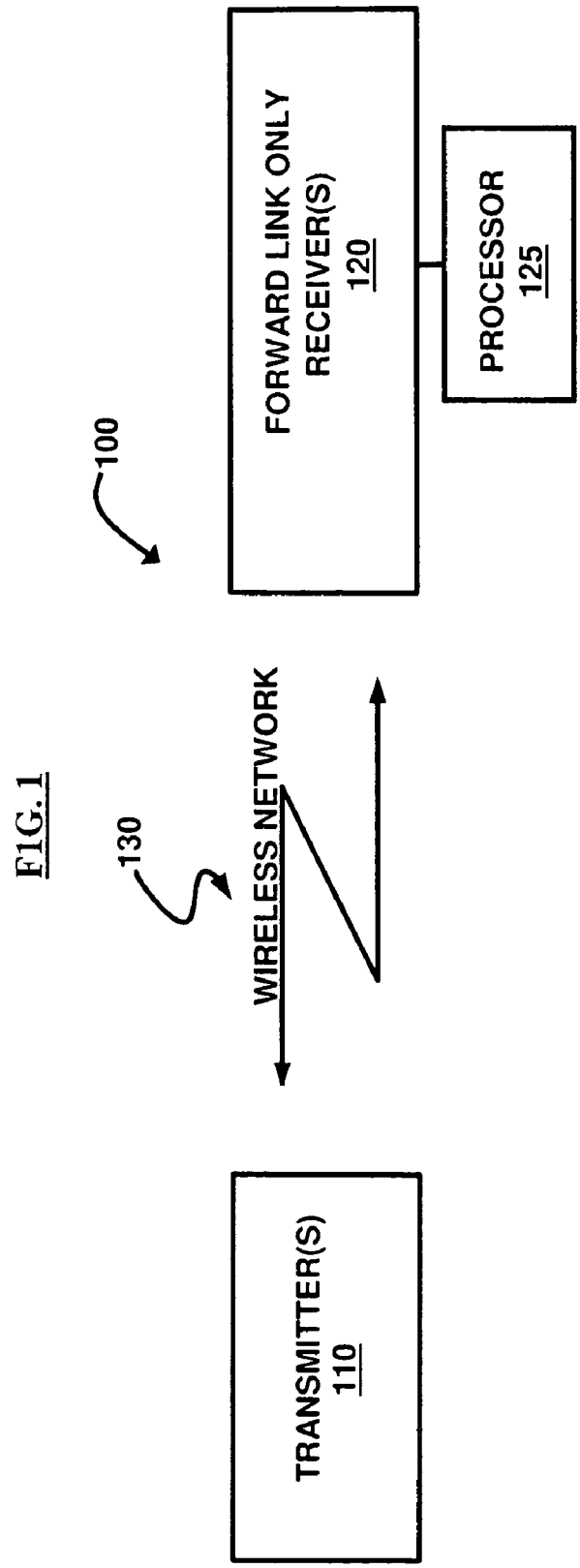
FIG. 1 illustrates a FLO system for a MediaFLO™ system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need to increase the fine carrier frequency estimation range in MediaFLO™ system receiver design. The embodiments herein achieve this by providing a technique of carrier frequency estimation and timing estimation using interpolated pilots. Referring now to the drawings, and more particularly to FIGS. 1 through 8, where similar reference characters denote corresponding features consistently throughout the figures, there are shown preferred embodiments.

The FLO system is comprised of two parts: (a) The FLO network, which includes the collection of transmitters and the backhaul network, and (b) The FLO device, which may be any type of communicating devices such as a cell phone, computer, personal assistant, laptop, handheld, or gaming consoles, etc. FIG. 1 illustrates a FLO system 100 for a MediaFLO™ system. The system 100 includes one or more transmitters 110 that communicate across a wireless network 130 to one or more receivers 120. A processor 125 receives and processes the symbol streams received by the receiver 120.

The FLO system 100 is utilized in developing an air interface for the MediaFLO™ mobile multicast system. The air interface uses Orthogonal Frequency Division Multiplexing (OFDM) as the modulation technique, which is also utilized by Digital Audio Broadcasting (DAB), (DVD-T), and (ISDB-T). To ensure that the user experience is as uniform as possible over the entire coverage area and optimize spectral efficiency and network economics, FLO system 100 employs the concept of Single Frequency Network (SFN) operation.

The FLO system 100 multicasts several services. A service is an aggregation of one or more related data components, such as the video, audio, text or signaling associated with a service. In an embodiment, the services are classified into two types based on their coverage area: Wide-area services and Local-area services. A Local-area service is multicast for reception within a metropolitan area. By contrast, Wide-area services are multicast in one or more metropolitan areas. The term Local-area is used to denote the transmitters within a metropolitan area. The term Wide-area is used to denote transmitters in one or more metropolitan areas that multicast the same Wide-area services. Thus, a Wide-area contains one or more Local-areas, with the transmitters in the different Local-areas multicasting different local area services and in an embodiment, using different radio frequency (RF) center frequencies.

FLO services are carried over one or more logical channels. These logical channels are called Multicast Logical Channels (MLC). An important aspect is that MLCs are distinguishable at the physical layer. For example, the video and audio components of a given service can be sent on two different MLCs. A FLO device (a receiver from the plurality of receivers 120) that is interested in the audio component can only receive the corresponding MLC without receiving the MLC for the video component, thereby saving battery resources.

The statistical multiplexing of different services, or MLCs, is achieved by varying only the MLC time and frequency allocations over prescribed time intervals to match the variability in the MLC's source rates. Statistical multiplexing in FLO enables the receivers 120 to demodulate and decode only the MLC(s) of interest. The data rates required by the services are expected to vary over a wide range, depending on their multimedia content. Thus, effective use of statistical multiplexing can significantly increase the number of services supported by a multicast system using a specified channel bandwidth.

In a typical OFDM based system, the sampling time of a receiver T' is usually not commensurate with that of a transmitter T; i.e., T≠T'. A carrier offset $\Delta f$ exists between the receiver and the transmitter. The phase difference between two successive OFDM symbols (assuming the corresponding OFDM sub-carriers do not carry information like the pilots carriers), then it can be shown that the following equation holds:

$$\Delta \varphi_k = 2\pi \left( \Delta f + \frac{\delta}{T_u} \cdot k \right) \quad (1)$$

where $\Delta\phi_k$ is the differential phase between two successive symbols of sub-carrier index k in rad/symbol; $\Delta f$ is the carrier offset between the receiver and the transmitter in terms of sub-carrier bin duration.

$$\delta = \frac{T - T'}{T'},$$

where T is the transmitter sampling period and T' is the receiver sampling period; k is the sub-carrier index; $T_u$ is the OFDM symbol duration excluding the guard interval.

Figure 2:
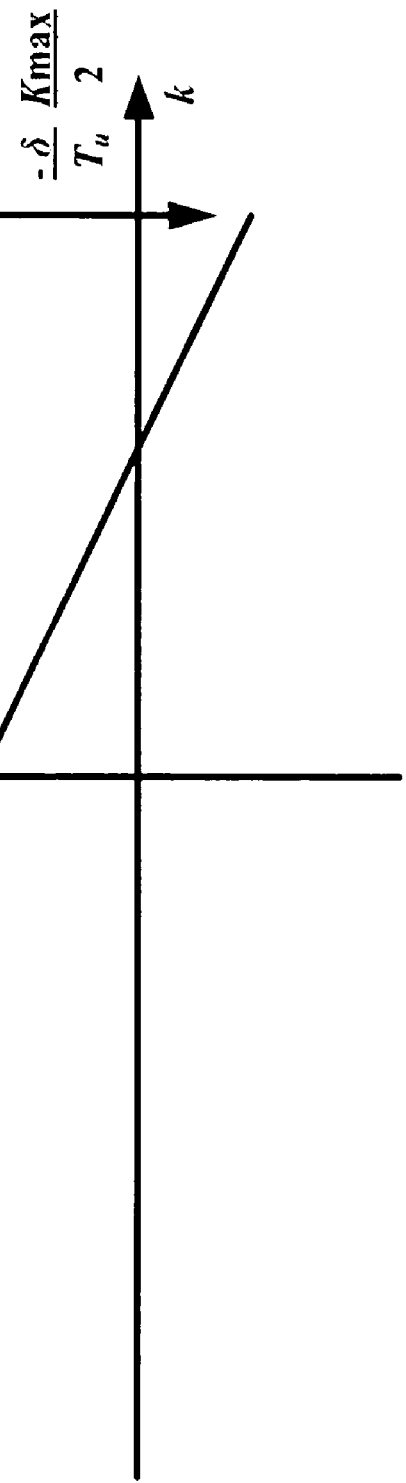
FIG. 2 is a graphical representation of the relationship between the differential phase and frequency and timing offset.

FIG. 2 is a graphical representation of equation (1). As illustrated in FIG. 2, equation (1) is shown as a straight line 210, and the slope of the straight line 210 equals the timing offset $\phi_\Delta$ apart from the scaling factor $T_u$. The mean intercept of the straight line 210 equals the carrier frequency offset $\phi_\mu$. Thus, the timing offset $\phi_\Delta$ and the carrier frequency offset $\phi_\mu$ may be obtained as follows:

$\phi_\Delta$=slope($\Delta\phi_k$)=$\delta/T_u$ $\phi_\mu$=$E[\Delta\phi_k]$=$\Delta f$ \quad (2)

Figure 3:
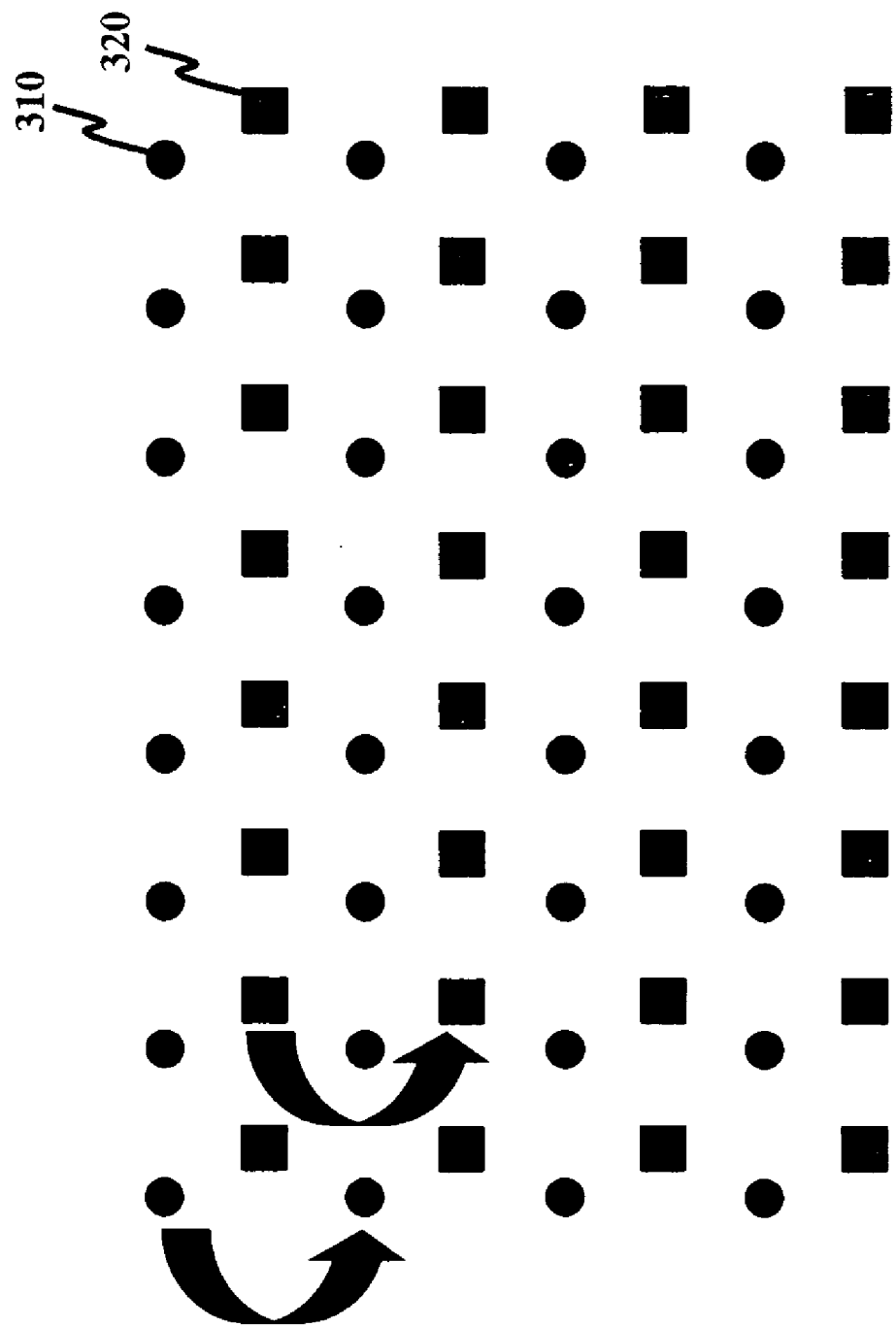
FIG. 3 illustrates the structure of scattered OFDM pilots considered in order to obtain an estimate of a straight line in a MediaFLO™ receiver design.

FIG. 3 illustrates the structure of scattered OFDM pilots considered in order to obtain an estimate of a straight line in a MediaFLO™ system receiver design according to an embodiment herein. As illustrated, the phase difference across OFDM pilots are taken every other symbols; i.e., either odd symbols 310 or even symbols 320. An estimate of the timing offset $\phi_\Delta$ and the carrier frequency offset $\phi_\mu$ may then be obtained as follows:

$$\varphi_\Delta = \frac{4}{L^2} \sum_{k=0}^{\frac{L}{2}-1} \left( \Delta \varphi_{\frac{L}{2}+k} - \Delta \varphi_k \right), \quad (3)$$

$$\varphi_\mu = \frac{1}{L} \sum_{k=0}^{L-1} \Delta \varphi_k$$

where L is the total number pilots involved in the estimation within one OFDM symbol.

In the case of channels with high Doppler frequency, the straight line 210 in FIG. 2 will not be clean and can be very noisy which leads to the wrap up of some values of $\Delta\phi_k$. Wrapping up happens for angle values that exceed $2\pi$. This is due to the fact that $\exp(\phi+2\pi)$ is equal to $\exp(\phi)$. Thus, values for angle values that exceed $2\pi$ may not be distinguishable.

Figure 4A:
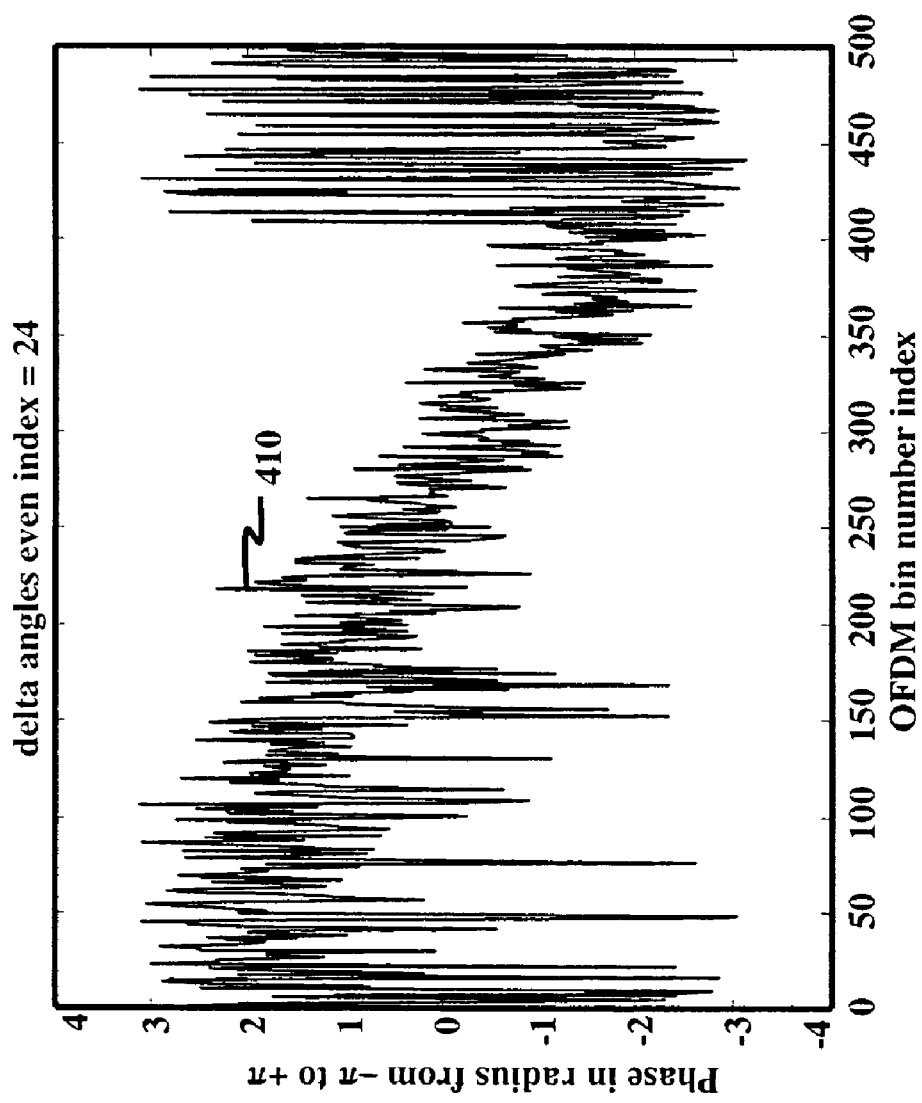
FIGS. 4A and 4B illustrate examples of Doppler fading effect on timing and carrier offset estimation.
Figure 4B:
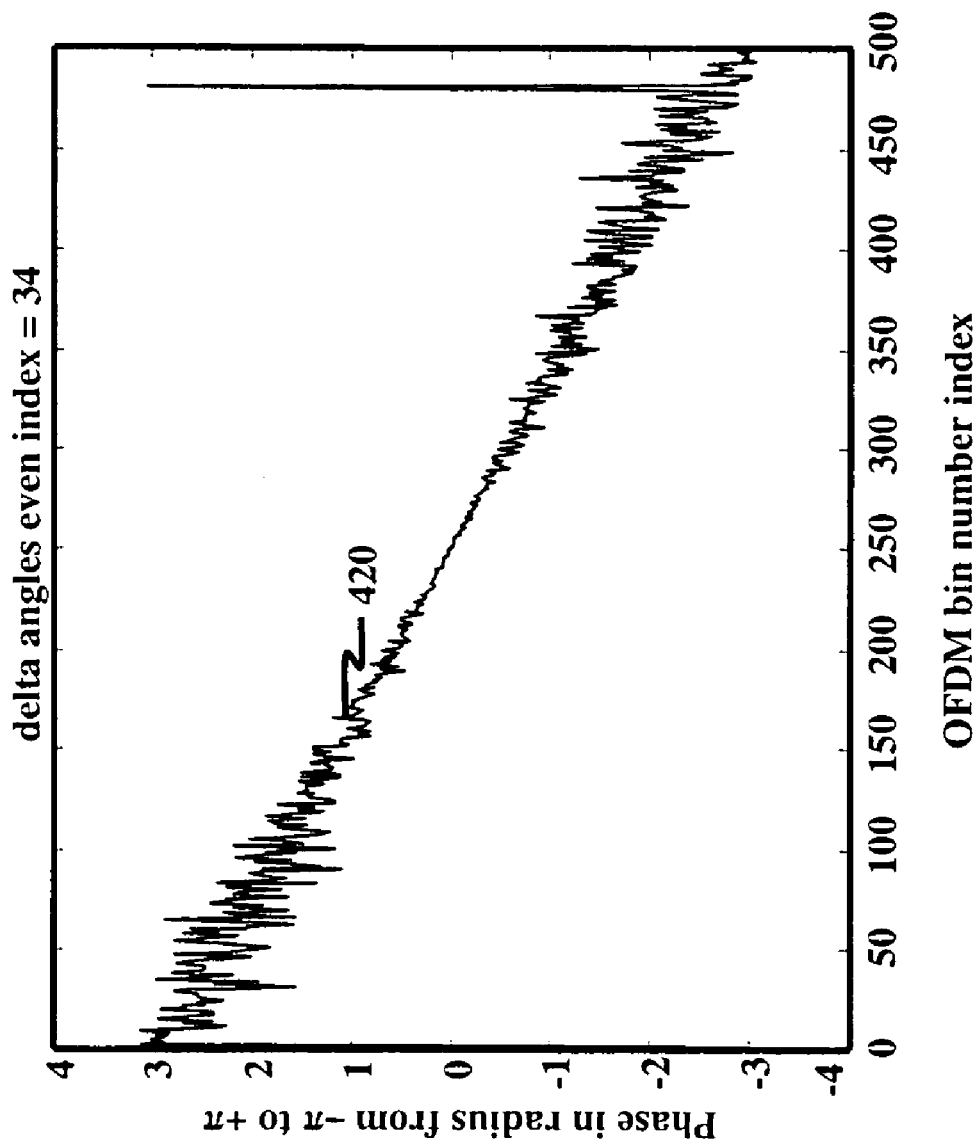

FIGS. 4A and 4B illustrate examples of Doppler fading effect on timing and carrier offset estimation. In the example of FIG. 4A, the Doppler fading effect shown is of a TU6 channel with Doppler 150 Hz, timing offset 100 ppm, and delta angles even index 24. In the example of FIG. 4B, the Doppler fading effect shown is of a ideal channel with timing offset 100 ppm, and delta angles even index 34. The line 410 of FIG. 4A and the line 420 of FIG. 4B are not clean and may be very noisy, which leads to the wrap up of some values of $\Delta\phi_k$. Thus, it is desirable to use moving averaging based techniques to smooth out the noisy effect caused by fast Doppler channel changes. In an embodiment, a moving averaging technique such as a leaky integrator may be used to smooth out the noisy effect.

As the differential phase are obtained between odd symbols 310 or even symbols 320 in FIG. 3, the relationship between the differential phase $\Delta\phi_k$, the timing offset $\delta$, and the carrier offset $\Delta f$ for the MediaFLO™ system application may be then given by the following equation:

$$\Delta \varphi_k = 4\pi \left( \Delta f + \frac{\delta}{T_u} \cdot k \right) \quad (4)$$

From equation (4) it may be observed that, in case the timing offset $\delta$=0 ppm, (i.e., no timing offset) in an embodiment, $\Delta f$ takes the maximum value when $\Delta\phi_k$=$\pm\pi$, according to equation (4), $\Delta f_{max}$=0.25 (bins), which translates to approximately 340 Hz. In case the timing offset $\delta\neq0$ ppm in another embodiment, it may be observed that $\Delta f_{max}$<0.25 (bins).

Figure 5:
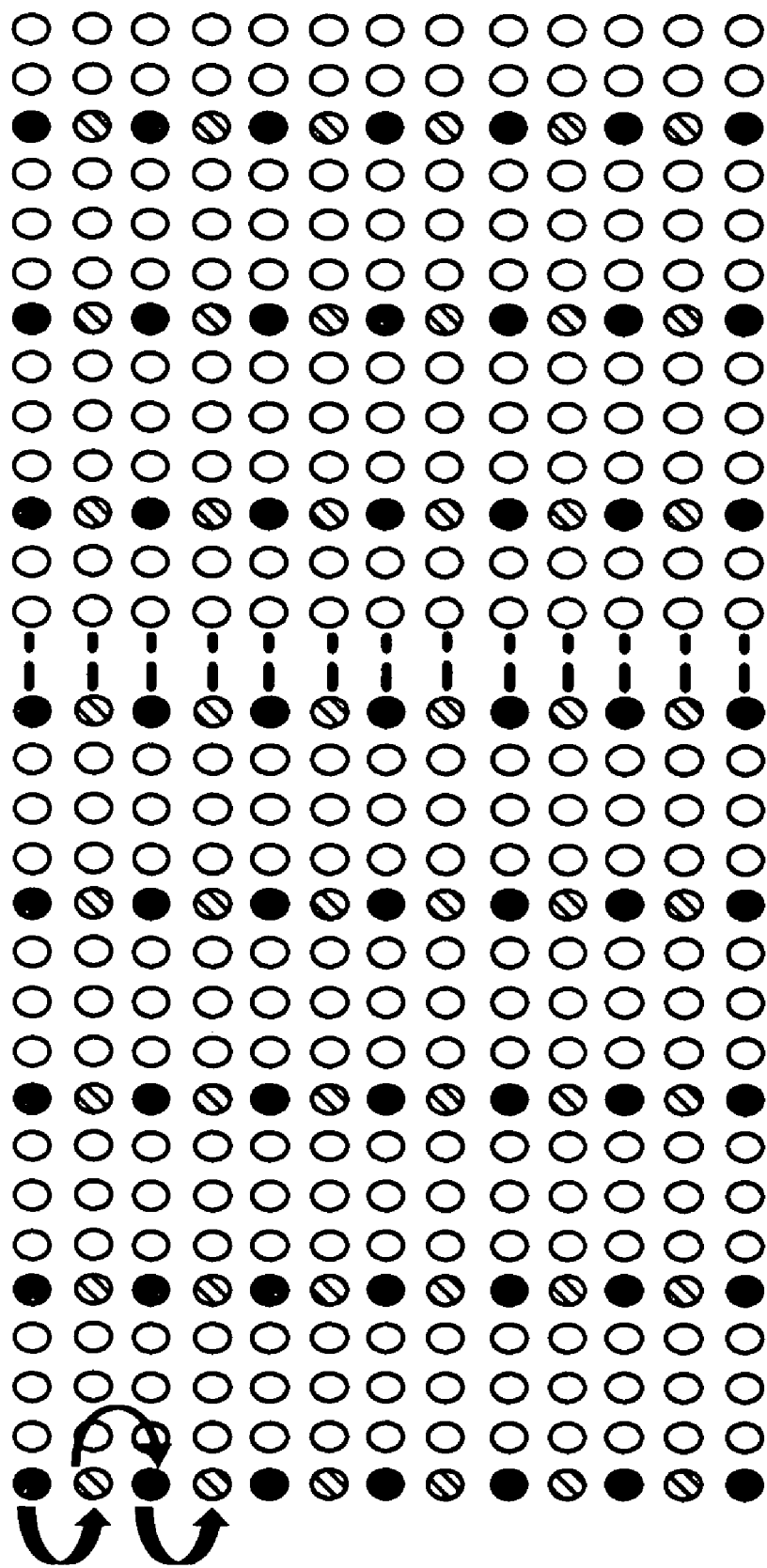
FIG. 5 illustrates the structure of interpolated scattered pilots for a MediaFLO™ receiver design.

As it is desired to further increase the carrier and timing offset carrier ranges, accordingly in accordance with an embodiment, the pilots are interpolated on the odd symbols 310 or the even symbols 320 of FIG. 3. FIG. 5 illustrates the structure of interpolated scattered pilots for a MediaFLO™ system receiver design according to an embodiment herein. The interpolated pilots are then used to determine the phase difference between two successive symbols instead of using the raw pilots over every other symbol. The corresponding differential phase may be then given by:

$$\Delta \varphi_k = 2\pi \left( \Delta f + \frac{\delta}{T_u} \cdot k \right) \quad (5)$$

From equation (5), it may be observed that, in case $\delta$=0 ppm, in an embodiment, $\Delta f$ takes the maximum value when $\Delta\phi_k$=$\pm\pi$, i.e., $\Delta f_{max}$=0.5 (bins), which translates to approximately 680 Hz. Thus, the estimation ranger has been doubled using this technique.

Figure 6A:
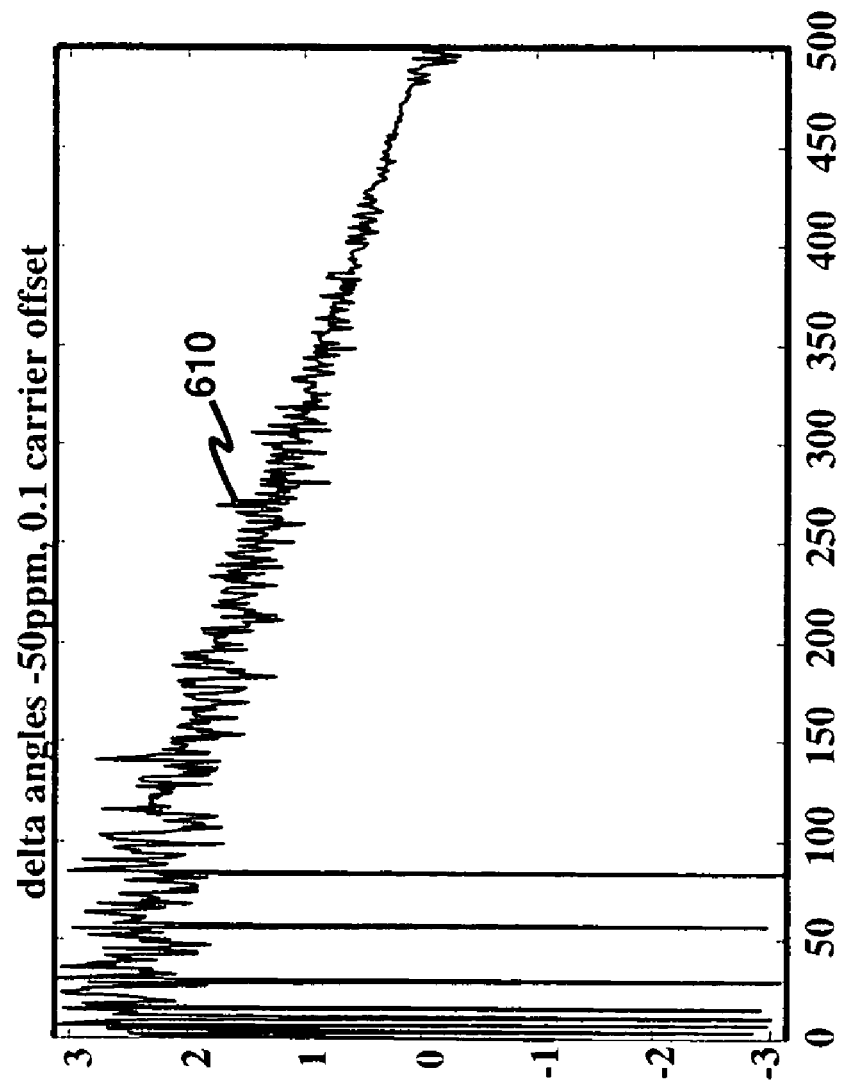
FIG. 6A illustrates a simulation result of a straight line obtained using a technique based on raw pilots.

FIG. 6A illustrates a simulation result of the straight line 610 obtained using a technique based on raw pilots. As illustrated in the example of FIG. 6A, the carrier offset tolerance is about 0.10 bin with 50 ppm timing offset. Further, the straight line 610 tends to wrap with an increase of the carrier offset tolerance from 0.10 bin. FIG. 6B illustrates a simulation result of the straight line 620 obtained using a technique based on interpolated pilots. In the example of FIG. 6B, it can be seen that with 50 ppm timing offset, the carrier offset tolerance is about 0.25 bin. The straight line 620 tends to wrap with further increase of the carrier offset tolerance from 0.25 bin. Thus, the technique using interpolated pilots doubles the estimation range of the carrier offset frequency to +/−0.5 OFDM sub carrier spacing, which corresponds to about +/−680 Hz at almost no complexity increment.

Figure 7:
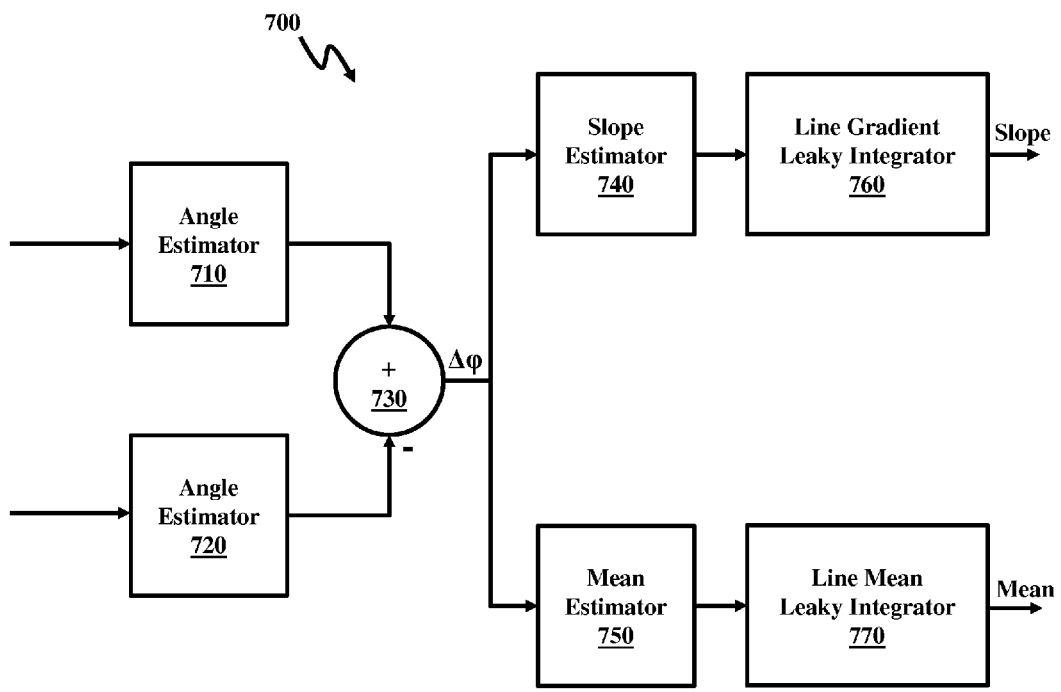
FIG. 7 is a block diagram illustrating an embodiment of a system for estimating a slope and a mean of a straight line obtained using a technique based on interpolated pilots.

FIG. 7 is a block diagram illustrating an embodiment of a system 700 for estimating a slope and a mean of a straight line obtained using a technique based on interpolated pilots. The system 700 comprises angle estimators 710, 720 to estimate angles of the interpolated pilots. The angle estimator 710 estimates an angle of current pilots and the angle estimator 720 estimates an angle of the previous pilots. A calculator 730 estimates the phase difference $\Delta\phi$ between the current pilot and the previous pilot. The resulting output of the calculator 730 is then provided to a slope estimator 740 and a mean estimator 750. As mentioned, graphically Δϕ is a straight line. The slope estimator 740 estimates the slope and the mean estimator 750 estimates the mean intercept of the straight line of Δϕ. To smooth out the noisy effect caused by fast Doppler channel changes, the resulting output of the slope estimator 740 is provided to a line gradient leaky integrator 760 and the resulting output of the mean estimator 750 is provided to a line mean leaky integrator 770. The resulting output of the line gradient leaky integrator 760 provides the slope of the straight line of Δϕ, wherein the slope equals the timing offset $\phi_\Delta$ and the resulting output of the line mean leaky integrator 770 provides the mean intercept of the straight line of Δϕ, wherein the mean intercept equals the frequency offset $\phi_\mu$.

Figure 8:
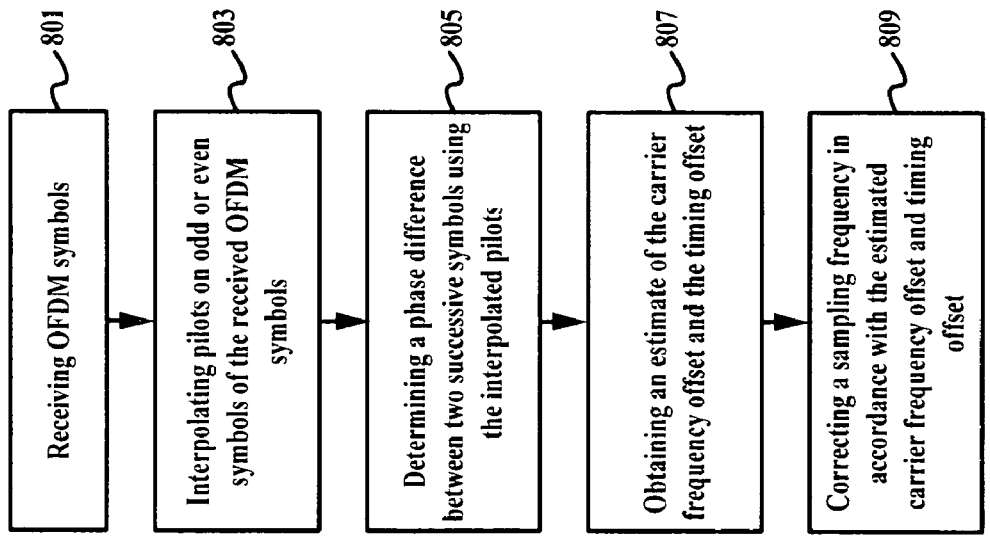
FIG. 8 is a flow diagram illustrating a preferred method according to an embodiment herein.

FIG. 8, with reference to FIGS. 1 through 7, illustrates a flow diagram illustrating a method of estimating a carrier frequency offset and a timing offset in a MediaFLO™ (Forward Link Only) system according to an embodiment herein, wherein the method comprises receiving (801) Orthogonal Frequency Division Multiplexing (OFDM) symbols; interpolating (803) pilots on odd or even symbols of the received OFDM symbols; determining (805) a phase difference between two successive symbols using the interpolated pilots; obtaining (807) an estimate of the carrier frequency offset and the timing offset from the determined phase difference between two successive symbols; and correcting (809) a sampling frequency in accordance with the estimated carrier frequency offset and timing offset.

Preferably, determining (805) the phase difference occurs using relation:

$$\Delta\varphi_k = 2\pi\left(\Delta f + \frac{\delta}{T_u} \cdot k\right),$$

wherein $\Delta\phi_k$ is a differential phase between two successive symbols of sub-carrier index k in rad/symbol, Δf is the carrier offset between a receiver and a transmitter in said MediaFLO™ (Forward Link Only) receiver system in terms of sub-carrier bin duration, $$\delta = \frac{T - T'}{T'},$$

where T is a transmitter sampling period and T' is a receiver sampling period, k is the sub-carrier index, and $T_u$ is an OFDM symbol duration excluding a guard interval.

Moreover, the method may further comprise determining $\Delta\phi_k$ for multiple sub-carrier index k using said relation; and representing the resulting values of $\Delta\phi_k$ graphically. Additionally, obtaining (807) of the estimate of the carrier frequency offset may be derived as the mean of intercept of the graphically represented values of $\Delta\phi_k$ and the timing offset may be derived as the slope of the graphically represented values of $\Delta\phi_k$.

Preferably, an estimate of the timing offset $\phi_\Delta$ and the carrier frequency offset $\phi_\mu$ is obtained using:

$$\varphi_\Delta = \frac{4}{L^2} \sum_{k=0}^{\frac{L}{2}-1} \left(\Delta\varphi_{\frac{L}{2}+k} - \Delta\varphi_k\right),$$

$$\varphi_\mu = \frac{1}{L} \sum_{k=0}^{L-1} \Delta\varphi_k$$

wherein L is a total number pilots involved in the estimation within one OFDM symbol.

Further, a relationship between the phase difference $\Delta\phi_k$, the timing offset δ, and the carrier offset Δf is given by:

$$\Delta\varphi_k = 4\pi\left(\Delta f + \frac{\delta}{T_u} \cdot k\right),$$

wherein when there is no timing offset, Δf takes a maximum value when $\Delta\phi_k = \pm\pi$.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 9:
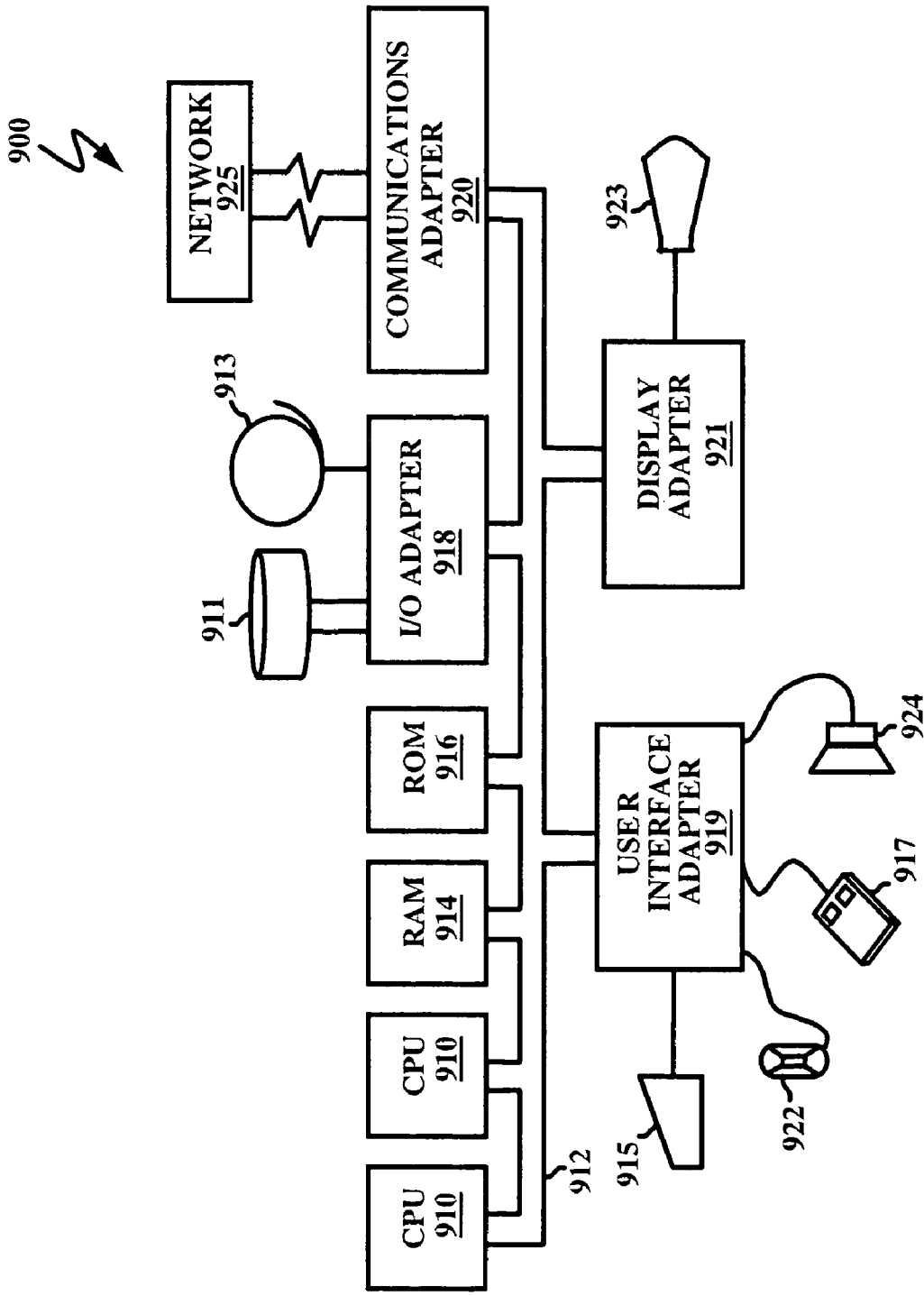
FIG. 9 illustrates a schematic diagram of a computer architecture used in accordance with the embodiments herein.

A representative hardware environment for practicing the embodiments herein is depicted in FIG. 9. This schematic drawing illustrates a hardware configuration of an information handling/computer system 900 in accordance with the embodiments herein. The system 900 comprises at least one processor or central processing unit (CPU) 910. The CPUs 910 are interconnected via system bus 912 to various devices such as a random access memory (RAM) 914, read-only memory (ROM) 916, and an input/output (I/O) adapter 918. The I/O adapter 918 can connect to peripheral devices, such as disk units 911 and tape drives 913, or other program storage devices that are readable by the system 900. The system 900 can read the inventive instructions on the program storage devices and follow these instructions to execute the methodology of the embodiments herein. The system 900 further includes a user interface adapter 919 that connects a keyboard 915, mouse 917, speaker 924, microphone 922, and/or other user interface devices such as a touch screen device (not shown) to the bus 912 to gather user input. Additionally, a communication adapter 920 connects the bus 912 to a data processing network 925, and a display adapter 921 connects the bus 912 to a display device 923 which may be embodied as an output device such as a monitor, printer, or transmitter, for example.

The sampling time of the receiver is not commensurate with that of the transmitter, and a carrier and time offset exists between the transmitter and the receiver. To ensure efficient communication between the transmitter and the receiver, the carrier and time offset need to be estimated and then corrected to ensure reliable quality communication. Accordingly, the embodiments herein provide a manner of achieving this.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of estimating a carrier frequency offset and a timing offset in a mobile multimedia multicast system, said method comprising:
   receiving Orthogonal Frequency Division Multiplexing (OFDM) symbols;
   interpolating pilots on odd or even symbols of the received OFDM symbols;
   determining a phase difference between two successive symbols using the interpolated pilots;
   obtaining an estimate of the carrier frequency offset and the timing offset from the determined phase difference between two successive symbols; and
   correcting a sampling frequency in accordance with the estimated carrier frequency offset and timing offset.

2. The method of claim 1, wherein determining the phase difference occurs using relation: $\Delta\phi_k = 2\pi(\Delta f + \delta/T_u \cdot k)$, wherein $\Delta\phi_k$ is a differential phase between two successive symbols of sub-carrier index k in rad/symbol, $\Delta f$ is the carrier offset between a receiver and a transmitter in said mobile multimedia multicast system in terms of sub-carrier bin duration, $\delta = T - T'/T'$, where T is a transmitter sampling period and T' is a receiver sampling period, k is the sub-carrier index, and $T_u$ is an OFDM symbol duration excluding a guard interval.

3. The method of claim 2, further comprising:
   determining $\Delta\phi_k$ for multiple sub-carrier index k using said relation; and
   representing the resulting values of $\Delta\phi_k$ graphically.

4. The method of claim 3, wherein the obtaining of the estimate of the carrier frequency offset is derived as the mean of intercept of the graphically represented values of $\Delta\phi_k$ and the timing offset is derived as the slope of the graphically represented values of $\Delta\phi_k$.

5. The method of claim 1, wherein an estimate of the timing offset $\phi_\Delta$ and the carrier frequency offset $\phi_\mu$ is obtained using:

$$\varphi_\Delta = \frac{4}{L^2} \sum_{k=0}^{\frac{L}{2}-1} \left(\Delta\varphi_{\frac{L}{2}+k} - \Delta\varphi_k\right),$$

$$\varphi_\mu = \frac{1}{L} \sum_{k=0}^{L-1} \Delta\varphi_k$$

wherein L is a total number pilots involved in the estimation within one OFDM symbol.

6. The method of claim 1, wherein a relationship between the phase difference $\Delta\phi_k$, the timing offset represented by $\delta$, and the carrier offset represented by $\Delta f$ is given by:

$$\Delta\varphi_k = 4\pi\left(\Delta f + \frac{\delta}{T_u} \cdot k\right),$$

wherein when there is no timing offset, $\Delta f$ takes a maximum value when $\Delta\phi_k = \pm\pi$.

7. A non-transitory program storage device readable by computer, tangibly embodying a program of instructions executable by said computer to perform a method of estimating a carrier frequency offset and a timing offset in a mobile multimedia multicast system, said method comprising:

receiving Orthogonal Frequency Division Multiplexing (OFDM) symbols;

interpolating pilots on odd or even symbols of the received OFDM symbols;

determining a phase difference between two successive symbols using the interpolated pilots;

obtaining an estimate of the carrier frequency offset and the timing offset from the determined phase difference between two successive symbols; and correcting a sampling frequency in accordance with the estimated carrier frequency offset and timing offset.

8. The program storage device of claim 7, wherein determining the phase difference occurs using relation:

$$\Delta\varphi_k = 2\pi\left(\Delta f + \frac{\delta}{T_u} \cdot k\right),$$

wherein $\Delta\phi_k$ is a differential phase between two successive symbols of sub-carrier index k in rad/symbol, $\Delta f$ is the carrier offset between a receiver and a transmitter in said mobile multimedia multicast system in terms of sub-carrier bin duration, $$\delta = \frac{T - T'}{T'},$$

where T is a transmitter sampling period and T' is a receiver sampling period, k is the sub-carrier index, and $T_u$ is an OFDM symbol duration excluding a guard interval.

9. The program storage device of claim 8, wherein said method further comprises:

determining $\Delta\phi_k$ for multiple sub-carrier index k using said relation; and representing the resulting values of $\Delta\phi_k$ graphically.

10. The program storage device of claim 9, wherein the obtaining of the estimate of the carrier frequency offset is derived as the mean of intercept of the graphically represented values of $\Delta\phi_k$ and the timing offset is derived as the slope of the graphically represented values of $\Delta\phi_k$.

11. The program storage device of claim 7, wherein an estimate of the timing offset $\phi_\Delta$ and the carrier frequency offset $\phi_\mu$ is obtained using:

$$\varphi_\Delta = \frac{4}{L^2}\sum_{k=0}^{\frac{L}{2}-1}\left(\Delta\varphi_{\frac{L}{2}+k} - \Delta\varphi_k\right),$$

$$\varphi_\mu = \frac{1}{L}\sum_{k=0}^{L-1}\Delta\varphi_k$$

wherein L is a total number pilots involved in the estimation within one OFDM symbol.

12. The program storage device of claim 7, wherein a relationship between the phase difference $\Delta\phi_k$, the timing offset represented by $\delta$, and the carrier offset represented by $\Delta f$ is given by:

$$\Delta\varphi_k = 4\pi\left(\Delta f + \frac{\delta}{T_u} \cdot k\right),$$

wherein when there is no timing offset, $\Delta f$ takes a maximum value when $\Delta\phi_k = \pm\pi$.

13. An apparatus for estimating a carrier frequency offset and a timing offset in a mobile multimedia multicast system, said apparatus comprising:

a receiver adapted to receive Orthogonal Frequency Division Multiplexing (OFDM) symbols;

a processor adapted to interpolate pilots on odd or even symbols of the received OFDM symbols;

a calculator adapted to determine a phase difference between two successive symbols using the interpolated pilots;

an estimator adapted to obtain an estimate of the carrier frequency offset and the timing offset from the determined phase difference between two successive symbols; and an integrator adapted to correct a sampling frequency in accordance with the estimated carrier frequency offset and timing offset.

14. The apparatus of claim 13, wherein determining the phase difference occurs using relation:

$$\Delta\varphi_k = 2\pi\left(\Delta f + \frac{\delta}{T_u} \cdot k\right),$$

wherein $\Delta\phi_k$ is a differential phase between two successive symbols of sub-carrier index k in rad/symbol, $\Delta f$ is the carrier offset between said receiver and a transmitter in said mobile multimedia multicast system in terms of sub-carrier bin duration, $$\delta = \frac{T - T'}{T'},$$

where T is a transmitter sampling period and T' is a receiver sampling period, k is the sub-carrier index, and $T_u$ is an OFDM symbol duration excluding a guard interval.

15. The apparatus of claim 14, wherein said $$\Delta\varphi_k o = 2\pi\left(\Delta f + \frac{\delta}{T_u} \cdot k\right)$$

is determined for multiple sub-carrier index k, and wherein the resulting values of $\Delta\phi_k$ are represented graphically.

16. The apparatus of claim 15, wherein the obtaining of the estimate of the carrier frequency offset is derived as the mean of intercept of the graphically represented values of $\Delta\phi_k$ and the timing offset is derived as the slope of the graphically represented values of $\Delta\phi_k$.

17. The apparatus of claim 13, wherein an estimate of the timing offset $\phi_\Delta$ and the carrier frequency offset $\phi_\mu$ is obtained using:

$$\varphi_\Delta = \frac{4}{L^2} \sum_{k=0}^{\frac{L}{2}-1} \left(\Delta\varphi_{\frac{L}{2}+k} - \Delta\varphi_k\right),$$

$$\varphi_\mu = \frac{1}{L} \sum_{k=0}^{L-1} \Delta\varphi_k$$

wherein L is a total number pilots involved in the estimation within one OFDM symbol.

18. The apparatus of claim 13, wherein a relationship between the phase difference $\Delta\phi_k$, the timing offset represented by $\delta$, and the carrier offset represented by $\Delta f$ is given by:

$$\Delta\varphi_k = 4\pi\left(\Delta f + \frac{\delta}{T_u} \cdot k\right),$$

wherein when there is no timing offset, $\Delta f$ takes a maximum value when $\Delta\phi_k = \pm\pi$.

19. The apparatus of claim 13, further comprising a transmitter adapted to transmit said OFDM symbols.

20. The apparatus of claim 19, further comprising a communication link between said receiver and said transmitter.

\* \* \* \* \*